United States Patent
Zhou et al.

(10) Patent No.: US 11,101,753 B2
(45) Date of Patent: Aug. 24, 2021

(54) CONTROL METHOD FOR DRIVING MOTOR ROTATION, ELECTRONIC GOVERNOR, POWER SYSTEM, AND UNMANNED AERIAL VEHICLE

(71) Applicant: SZ DJI TECHNOLOGY CO., LTD., Shenzhen (CN)

(72) Inventors: Changxing Zhou, Shenzhen (CN); Wanqi Liu, Shenzhen (CN); Qiu Lan, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/654,838

(22) Filed: Oct. 16, 2019

(65) Prior Publication Data
US 2020/0052623 A1 Feb. 13, 2020

Related U.S. Application Data

(63) Continuation of application No. PCT/CN2017/081839, filed on Apr. 25, 2017.

(51) Int. Cl.
*H02P 7/03* (2016.01)
*B64C 39/02* (2006.01)
*B64D 31/00* (2006.01)

(52) U.S. Cl.
CPC .............. *H02P 7/03* (2016.02); *B64C 39/024* (2013.01); *B64D 31/00* (2013.01); *B64C 2201/12* (2013.01); *H02P 2203/01* (2013.01)

(58) Field of Classification Search
CPC ............ H02P 7/03; B64C 39/02; B64D 31/00
See application file for complete search history.

(56) References Cited

U.S. PATENT DOCUMENTS

| | | | | |
|---|---|---|---|---|
| 4,748,387 A | * | 5/1988 | Tanuma | H02P 6/22 318/400.08 |
| 4,827,195 A | | 5/1989 | Newell et al. | |
| 5,629,567 A | * | 5/1997 | Kumar | B60L 3/10 290/3 |
| 2007/0214906 A1 | * | 9/2007 | Fahland | F16H 59/38 74/340 |
| 2015/0276363 A1 | * | 10/2015 | Ando | F42B 15/01 701/11 |
| 2017/0320569 A1 | * | 11/2017 | Gordon | B64O 39/024 |
| 2019/0071172 A1 | * | 3/2019 | Caldwell | B64D 35/00 |

(Continued)

FOREIGN PATENT DOCUMENTS

| | | |
|---|---|---|
| CN | 204871616 U | 12/2015 |
| CN | 105691613 A | 6/2016 |
| CN | 205293077 U | 6/2016 |

(Continued)

OTHER PUBLICATIONS

The World Intellectual Property Organization (WIPO) International Search Report for PCT/CN2017/081839 dated Jan. 26, 2018 6 pages.

*Primary Examiner* — Bentsu Ro
(74) *Attorney, Agent, or Firm* — Anova Law Group, PLLC

(57) ABSTRACT

A method for controlling a motor includes obtaining addressing information of an electronic speed governor coupled to the motor, determining a rotation direction of the motor based on the addressing information, and providing a drive signal to the motor according to the rotation direction.

20 Claims, 3 Drawing Sheets

(56) References Cited

U.S. PATENT DOCUMENTS

2020/0090255 A1* 3/2020 Rodriguez Bravo ........................ G06Q 30/0641

FOREIGN PATENT DOCUMENTS

| CN | 205525004 U | 8/2016 |
| CN | 106687936 A | 5/2017 |
| CN | 107087428 A | 8/2017 |
| JP | H01308106 S | 12/1989 |

* cited by examiner

CONTROL METHOD FOR DRIVING MOTOR ROTATION, ELECTRONIC GOVERNOR, POWER SYSTEM, AND UNMANNED AERIAL VEHICLE

CROSS-REFERENCE TO RELATED APPLICATION

This application is a continuation of International Application No. PCT/CN2017/081839, filed on Apr. 25, 2017, the entire content of which is incorporated herein by reference.

TECHNICAL FIELD

The present disclosure relates to the technical field of motor control and, more particularly, to a control method for driving motor rotation, an electronic governor, a power system, and an unmanned aerial vehicle (UAV).

BACKGROUND

Unmanned aerial vehicles (UAVs) have been widely used in many fields, such as, industry, agriculture, military, and other fields. In the agriculture field, the UAVs are used for spraying pesticides on farmland or collecting plant protection data on agriculture and forestry. In the industry field, the UAVs are used for performing power inspections on, for example, long-distance transmission facilities, environmental monitoring of factories, aerial photography of affected areas, and the like. In the military field, the UAVs are used for collecting battlefield intelligence in real time, coordinating various arms for coordinated strikes, and performing radiocommunication suppression in battlefield, and the like.

The UAVs are broadly classified into unmanned helicopters, fixed-wing UAVs, multi-rotor UAVs, unmanned airships, and unmanned paragliders. The multi-rotor UAVs are most commonly used in people's daily lives. The multi-rotor UAVs generally have multiple rotors. Each rotor is driven by a separate motor and controlled by the UAV's flight control system (hereinafter also referred to as "flight controller"). As such, the UAVs can perform various actions, such as forward, backward, ascending, descending, hovering, and the like.

SUMMARY

In accordance with the disclosure, there is provided a method for controlling a motor including obtaining addressing information of an electronic speed governor coupled to the motor, determining a rotation direction of the motor based on the addressing information, and providing a drive signal to the motor according to the rotation direction.

Also in accordance with the disclosure, there is provided an electronic governor including a driving circuit configured to provide a driving signal to a motor to drive the motor to rotate, and a controller electrically coupled to the driving circuit and configured to determine a rotation direction of the motor based on addressing information of the electronic governor, and control the driving circuit to provide a corresponding driving signal to the motor according to the rotation direction.

BRIEF DESCRIPTION OF THE DRAWINGS

In order to provide a clearer illustration of technical solutions of disclosed embodiments, the drawings used in the description of the disclosed embodiments are briefly described below.

DETAILED DESCRIPTION OF THE EMBODIMENTS

Figure 1:
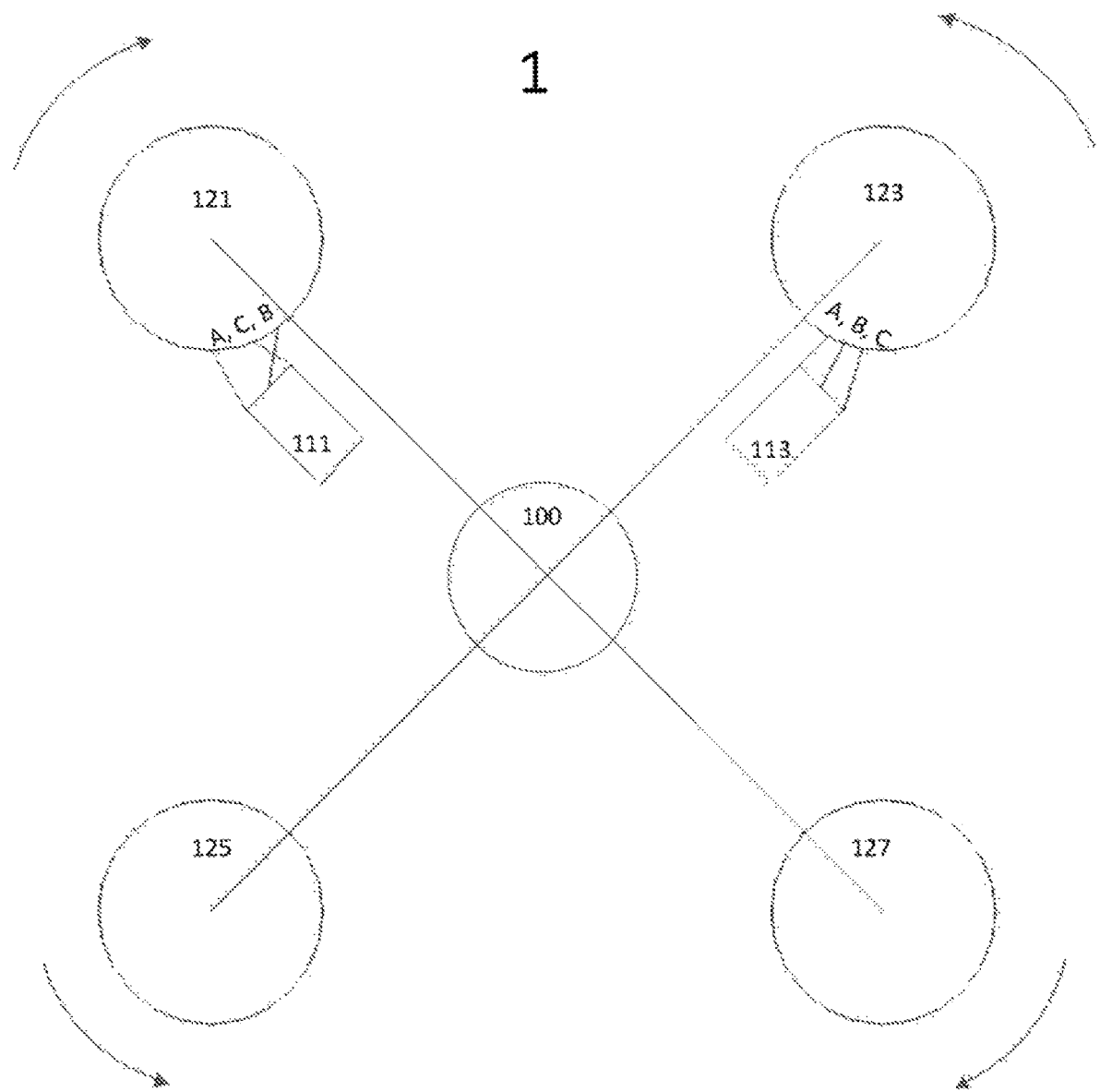
FIG. 1 schematically shows an example wire-connection of an unmanned aerial vehicle (UAV) according to conventional technologies.

Example embodiments will be described with reference to the accompanying drawings. Other technical aspects, advantages, and features of the present disclosure will be apparent to those skilled in the art in the light of the example embodiments disclosed herein. The terms "including," "comprising," and variations thereof herein are open, non-limiting terminologies.

It will be appreciated that the described embodiments are merely examples and not to limit the scope of the disclosure. It is intended that the description with reference to the accompanying drawings are for the purposed of illustrating the example embodiments with a true scope and spirit being indicated by the following claims. The specific details in the various embodiments are merely for the purposes of illustrating the present disclosure. It will be apparent to those skilled in the art that various modifications or variations can be made by those skilled in the art in view of the example embodiments disclosed herein without departing from the scope and spirit of the present disclosure. For simplification purposes, descriptions of well-known functions and structures are omitted herein. In addition, the same numbers in the drawings refer to the same or similar elements.

Before describing various embodiments of the present disclosure in detail, various terms that may be used herein will be introduced.

Flight control system (hereinafter also referred to as "flight controller"). Flight controller refers to a control system that can stabilize a flight attitude of an unmanned aerial vehicle (UAV) and control an autonomous or semi-autonomous flight of the UAV. The flight controller can be regarded as a brain of the UAV. Generally, the flight controller can determine a current flight attitude of the UAV via various sensors (e.g., gyroscopes, accelerometers, geomagnetic sensors, air pressure sensors, GPS modules, and/or the like) carried by the UAV. Each rotor of the UAV can be controlled by an electronic speed governor and a corresponding motor to achieve a target flight attitude.

Electronic speed governor (hereinafter also referred to as "electronic governor"). The electronic governor refers to a driver for driving a brushless direct-current (DC) motor on a multi-rotor UAV. An input terminal of the electronic governor generally includes two wires (e.g., positive and negative power supplies), and an output terminal of the electronic governor generally includes three wires (e.g., phase lines). A speed and/or rotation direction of the motor connecting to the electronic governor can be controlled by adjusting, for example, a voltage, frequency, phase, or the like, of each phase line at the output terminal.

Electronic governor addressing. The electronic governor needs to communicate with the flight controller to receive commands and/or report an operating status, however, multiple electronic governors corresponding to multiple motors on the multi-rotor UAV are generally connected to a serial port or a bus (e.g., 485) of a processor of the flight controller. In order to avoid bus conflict caused by the multiple electronic governors sending data to the bus at the same time, electronic governor addressing is needed. For example, a unique communication ID (or address information) can be assigned to each electronic governor connected to the bus. Addressing methods can include software addressing or hardware addressing. In some embodiments, the hardware addressing refers to that each electronic governor can include a specific resistor on its circuit board and different divided voltage values can be obtained via different resistance values of the resistors. As such, a single chip microcomputer of each electronic governor can determine its own address by detecting the different voltage values. For example, each electronic governor can have an analog input port that can determine the voltage across the resistor in series with the corresponding electronic governor, such that the addressing information can be determined based on the voltage. In some embodiments, software addressing refers to the following processes. A normal pulse width of Pulse Width Modulation (PWM) signal sent by the flight controller to the electronic governor is around 940 to 2000 microseconds. When the flight controller sends a short pulse of 500 microseconds to a specific ESC, a request for returning data packet by No. 1 electronic governor is broadcasted on the bus at the same time. The specific electronic governor receiving the short pulse of 500 microseconds can be activated and return a broadcast data packet of the flight controller, such that the specific electronic governor can be registered as No. 1 in the flight controller. Similarly, the address of each electronic governor (e.g., No. 2, No. 3, and the like) can be determined by the flight controller.

Hereinafter, taking the UAV as an example, a solution for controlling the rotation direction of the motor consistent with the disclosure will be described in detail. However, it should be appreciated that the technical solutions according to embodiments of the present disclosure are not limited to the field of UAVs but also applicable to other fields. The technical solutions according to embodiments of the present disclosure can be applied as long as controlling the rotation direction of the motor is involved.

An example wire-connection solution between the electronic governor and the motor in the UAV according to the conventional technologies will be described in detail below with reference to FIG. 1. FIG. 1 schematically shows an example wire-connection of a UAV 1 according to conventional technologies. As shown in FIG. 1, the UAV 1 includes a flight controller 100, one or more electronic governors 111 and 113, and motors 121, 123, 125, and 127 each corresponding to one of the one or more electronic governors. For simplification and convenience, only two electronic governors 111 and 113 are shown in FIG. 1, and the electronic governors corresponding to the motors 125 and 127 are omitted in FIG. 1. Each motor can have a corresponding electronic governor to achieve individual control thereof. In addition, four motors are shown in FIG. 1 (i.e., the UAV 1 is a quadrotor UAV), however, the present disclosure is not limited thereto. The UAV 1 can be a UAV including any number of rotors, or more generally, a device having any number of motors. Although FIG. 1 shows four motors 121, 123, 125, and 127 arranged at ends of four arms of the UAV 1 and the flight controller 100 arranged at an intersection of the four arms, the layout of the motors and flight controller is not limited thereto. The motors, electronic governors, and/or flight controller can be arranged at any other suitable locations without affecting the application of the technical solution consistent with the present disclosure.

As shown in FIG. 1, the four rotors of the quadrotor UAV 100 (the corresponding four motors 121, 123, 125, and 127) generally do not rotate in a same direction. Otherwise, a body of the UAV 100 will spin in the air in a direction opposite to the rotation direction of the four rotors. Therefore, as shown in FIG. 1, in order to ensure that a state of the UAV 1 during flight is stable, the rotation direction of the diagonal rotors may be the same, and the rotation direction of the adjacent rotors may be opposite to each other. For example, the rotation direction of the motors 121 and 127 can be clockwise, and the rotation direction of the motors 123 and 125 can be counterclockwise.

In this way, when assembling the UAV 1, the phase lines of the motors can be interchanged to distinguish the rotation directions of the motors. A common connection between the electronic governor and the brushless DC motor generally includes three phase lines, which are hereinafter referred to as A/B/C phase lines. The rotation direction of the motor driven by the electronic governor can be changed by exchanging any two of the three phase lines. For example, as shown in FIG. 1, assume that the default rotation directions of the four motors 121, 123, 125, and 127 are counterclockwise (for example, the four motors can be of the same type, but the disclosure is not limited thereto). In order to cause the rotation direction of the motor 121 opposite to the rotation direction of the motor 123, any two phase lines between the electronic governor 111 and the corresponding motor 121 can be interchanged, for example, B and C can be interchanged. As such, the motor 121 can be rotated in the clockwise direction.

However, when the assembler installs, for example, the motor 121, it is easy to forget to interchange the phase lines and cause misoperation. In addition, a new assembler may need special training to perform the assembly. The rotation direction of the motor being wrong is generally found after assembly, such that disassemble and rework are needed, resulting in wasted working hours and production materials.

Therefore, in order to simplify a production process to effectively reduce a defective rate, and enable the assembler to skillfully perform a welding assembly without specific training, a solution for controlling the rotation direction of the motor by software consistent with the disclosure is proposed. As such, when welding the phase lines of the motor to the electronic governor, the welding can be performed directly in a same wire sequence without an additional phase-line-interchange welding operation.

Figure 2:
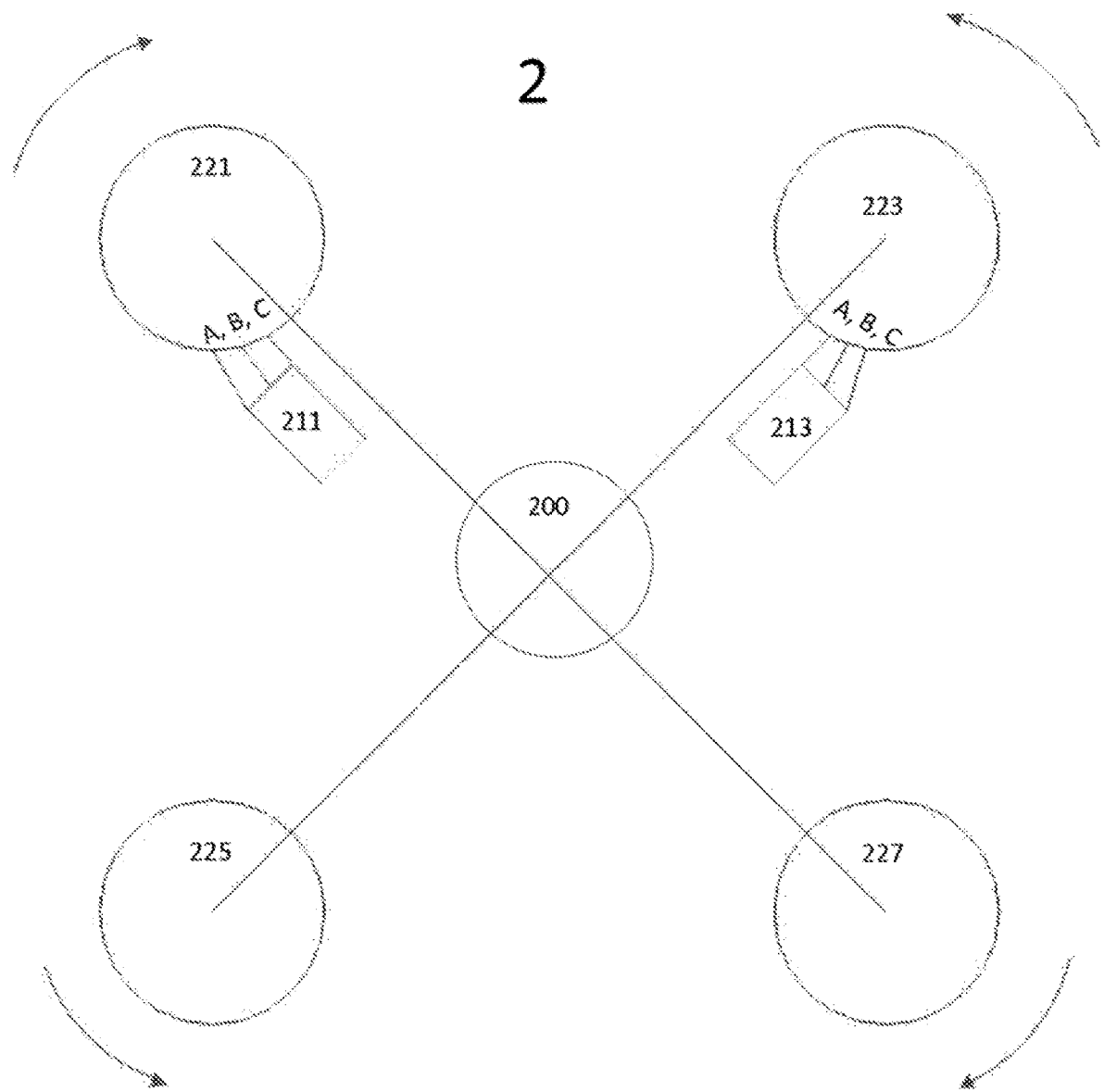
FIG. 2 schematically shows an example wire-connection of a UAV consistent with embodiments of the disclosure.

An example wire-connection solution between the electronic governor and the motor in the UAV consistent with the disclosure will be described in detail below with reference to FIG. 2. FIG. 2 schematically shows an example wire-connection of a UAV 2 consistent with embodiments of the disclosure. As shown in FIG. 2, the UAV 2 includes a flight controller 200, one or more electronic governors 211, 213, and motors 221, 223, 225, and 227 corresponding to electronic governors. In the present embodiment, the UAV 2 in FIG. 2 is substantially similar to the UAV 1 in FIG. 1, and the only difference is the wire connection between the electronic governor 211 and the motor 221 and the wire connection between the electronic governor 111 and the motor 121. As shown in FIG. 2, the wire connection between the electronic governor 211 and the motor 221 and the wire connection between the adjacent electronic governor 213 and the motor 223 are the same. In this way, if the electronic governor 211 still supplies the same driving signal to the motor 221, the rotation direction of the motor 221 should be the same as that of the motor 223, for example, both in the counterclockwise direction. Although not shown in FIG. 2, the wire connection between the motor 227 and the corresponding electronic governor are different from the wire connection between the motor 127 and the corresponding electronic governor shown in FIG. 1, such that the default rotation direction of the motor 227 is also counterclockwise.

In order to enable the motor 221 to rotate in the reverse direction during operation (e.g., the clockwise direction), after the electronic governor 211 is assembled to the UVA 2, the flight controller 200 can assign the addressing information (ID) to the electronic governor 221 upon being powered up. The electronic governor 211 can determine its arrangement position (e.g., the number of the arm), according to its own ID number, and can determine the rotation direction of the motor 221 (i.e., an operating rotation direction). In the operating state, when the electronic governor 211 drives the motor 221, the electronic governor 211 can change a phase sequence of driving signals on the A/B/C three phase lines (e.g., A, B, and C) by software control (hereinafter also referred to as "phase sequence"). For example, the electronic governor 211 can provide three sine waves or square waves with phase differences of 120° to the three phase lines A, B, and C, in default. For example, the phase sequence is A>B>C. In this way, if the phase sequence of the A/B/C phase lines is determined to be changed, the software of the electronic governor 211 can be implemented to change the rotation direction of the motor by changing the sequence in which the driving signals are sent as A>C>B. Therefore, a signal interchange between any two phase lines of the three phase lines can be realized via software, and the same effect as the hardware method shown in FIG. 1 can be achieved.

In some embodiments, the electronic governor 211 can determine which driving signal should be output according to its own addressing information and a preset correspondence between the addressing information and the driving signal. For example, the preset correspondence may be determined as follows. If the addressing information is, for example, an ID number 1, the operating driving signal whose phase sequence is changed as compared with the default driving signal can be outputted, and if the addressing information is, for example, an ID number. 2, the default driving signal can be outputted, and so on and so forth. Thus, the rotation directions of the motor 221 and the motor 223 can be reversed by software. In some embodiments, the preset correspondence may be stored locally in the electronic governor 211 and/or the electronic governor 213, for example, in text, data tables, or other suitable form. In some other embodiments, the preset correspondence may be stored in the flight controller 200 for an inquiry when each electronic governor is powered on.

In some embodiments, the flight controller 200 can send a command to the electronic governor 211 to confirm the phase sequence of the motor. Upon receiving the command, the electronic governor 211 can write information of the rotation direction of the motor 221 into its own memory (for example, a flash memory). As such, the motor can be rotated normally even when a communication connection is disconnected or the flight controller 200 cannot address the electronic governor 211. In addition, in the case of rework, maintenance, or the like, the flight controller 200 can send a command to the electronic governor 211 to unlock the rotation direction of the motor 221. Upon receiving the command, the electronic governor 211 can erase the information of the rotation direction of the motor 221 from its own memory (e.g., the flash memory), such that the electronic governor 211 can provide the driving signal for the motor 221 to rotate in the default rotation direction.

In some other embodiments, when the motor is produced, outlet wires of the motor 221 can be directly changed. That is, a wire sequence can be directly interchanged in an outlet of the motor 221, the same phase sequence as described above can be realized when the motor 221 is soldered to the circuit board of the electronic governor 211.

For the other electronic governors/motors in the UAV 2, the solution for controlling the rotation direction of the motor described above can also be implemented, thereby achieving separate control of the rotation directions of the rotors. Although the embodiments described above illustrate controlling the rotation direction of the motor 221 by the electronic governor 211, the present disclosure is not limited thereto. The solution can also be performed on other hardware. For example, if the flight controller 200 instructs the electronic governor to output the operating drive signal corresponding to the operating rotation direction, the same technical effect can be achieved. As such, all or part of the electronic governors/motors can be controlled at the flight controller 200 to achieve the same or better flight controller.

Although the embodiments described above use the separate electronic governor 211 as an example device for driving the motor 221, the present disclosure is not limited thereto. For example, in the case where the motor speed can be constant, a separate chip, for example, a field programmable gate array (FPGA), an application specific integrated circuit (ASIC), or the like, rather than an electronic governor, can be used to implement the change of the rotation direction without controlling the speed of the motor. As another example, the electronic governor 211 can be used to simultaneously drive the motors 221 and 227 to, for example, reduce cost, reduce weight, and the like. Therefore, the electronic governor 211 can be considered as a (motor) controller of the motor 221.

A solution for controlling the rotation direction of the motor consistent with the disclosure has been described in detail with reference to the FIGS. 1 and 2. The software of the electronic governor can automatically determine that the number of arm which it arranged at and confirm the rotation direction of the motor. In this way, the welding can be carried out in a fixed welding sequence during production and assembly, which can greatly simplify the production process.

A control method 300 for driving the motor rotation and the functional configuration of a electronic governor 400 for implementing the control method 300 consistent with the disclosure will be described in detail below with reference to FIGS. 3 and 4.

Figure 3:
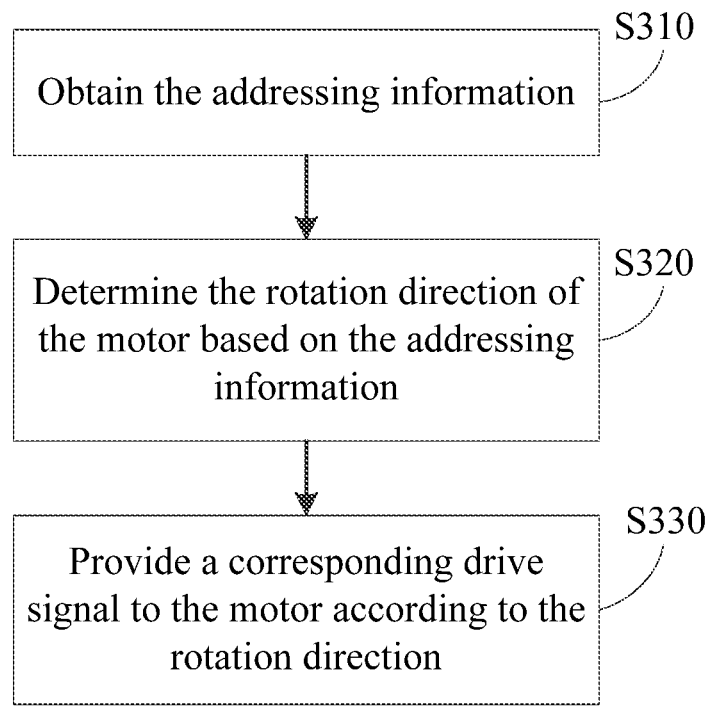
FIG. 3 is a schematic flow chart of a method for controlling a rotation direction of a motor consistent with embodiments of the disclosure.

FIG. 3 is a schematic flow chart of the method 300 for controlling the rotation direction of the motor consistent with the disclosure. As shown in FIG. 3, the method 300 includes processes at S310, S320, and S330. Consistent with the disclosure, some of the processes of the method 300 may be performed separately or in combination, and may be performed in parallel or sequentially. An implementation sequence of the processes is not limited to the specific sequence illustrated in FIG. 3. In some embodiments, the method 300 can be implemented by the flight controller 200 or the electronic governor 211, electronic governor 213, or the like, of the UAV 2 shown in FIG. 2.

Figure 4:
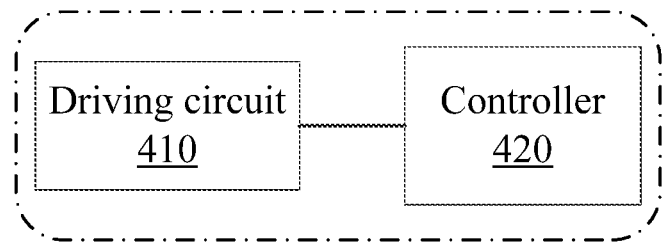
FIG. 4 is a functional architectural diagram of an example device for implementing the method in FIG. 3 consistent with embodiments of the disclosure.

FIG. 4 is a functional architectural diagram of an example device 400 consistent with the disclosure. The device 400 may be the UAV 200 or the electronic governor 211, the electronic governor 213, or the like, in FIG. 2. As shown in FIG. 4, the device 400 includes a driving circuit 410 and a controller 420.

The driving circuit 410 can be configured to provide the driving signal to the motor (e.g., motor 221) to drive the motor (e.g., motor 221) to rotate.

The controller 420 can be electrically coupled to the driving circuit 410 and configured to control the driving circuit 410. The controller 420 can determine the rotation direction of the motor (e.g., the motor 221) based on the addressing information of the electronic governor 400, and control the driving circuit 410 to provide a corresponding driving signal to the motor (e.g., the motor 221) according to the rotation direction. The controller 420 can be a central processing unit (e.g., a CPU), a digital signal processor (DSP), a microprocessor, a microcontroller, or the like, of electronic governor 400. In some embodiments, the controller can include a microcontroller unit (MCU), or the like. The driving circuit can include a metal-oxide semiconductor (MOS) transistor driving circuit, or the like.

The electronic governor 400 may also include other functional units not shown in FIG. 4. However, since they do not affect those skilled in the art to understand the embodiments of the present disclosure, they are omitted in FIG. 4. For example, the electronic governor 400 can also include one or more of the functional units, for example, power, memory, bus, antenna, wireless transceiver, and the like.

The control method 300 for driving motor rotation and the electronic governor 400 consistent with the disclosure will be described in detail below with reference to FIGS. 3 and 4.

As shown in FIG. 3, at S310, the controller 420 of the electronic governor 400 obtains the addressing information.

At S320, the controller 420 of the electronic governor 400 determines the rotation direction of the motor based on the addressing information.

At S330, the driving circuit 410 of the electronic governor 400 provides a corresponding drive signal to the motor (e.g., the motor 221) according to the rotation direction.

In some embodiments, the rotation direction of the motor may be determined based on the preset correspondence between the addressing information and the rotation direction of the motor. For example, the preset correspondence can be stored in the controller 420 of the electronic governor 400.

In some embodiments, the rotation direction of the motor may be determined based on a calculation according to the addressing information. For example, the controller 420 of the electronic governor 400 can calculate the arrangement position of the electronic governor 400 (e.g., the number of the arm), according to the ID number of the electronic governor 400, and thus can determine the rotation direction of the motor.

In some embodiments, the process at S310 can include obtaining an addressing signal sent by an external controller, and determining the addressing information according to the addressing signal. For example, the controller 420 of the electronic governor 400 can be configured to communicate with the external controller via a communication link between the controller 420 and the external controller. Hence, the controller 420 can receive the addressing signal from the external controller. In some embodiments, the addressing signal can include the PWM signal.

In some embodiments, the process at S310 can include obtaining voltage information of the analog input port, and determining the addressing information according to the voltage information. For example, the controller 420 can include the analog input port and configured to determine the addressing information according to the voltage information of the analog input port. In some embodiments, before obtaining the voltage information of the analog input port, the method 300 may further include connecting a preset resistor in series with the communication link between the controller 420 and the external controller, and detecting the voltage value across the preset resistor via the analog input port.

In some embodiments, the method 300 can further include storing information of the rotation direction of the motor. For example, the electronic governor 400 can further includes a memory configured to store the information of the rotation direction of the motor. The memory can be any suitable memory, for example, a flash memory. The controller 420 and the memory can be separately devices or integrated together. In some embodiments, the method 300 can further include reading the stored information of the rotation direction of the motor, and providing the corresponding drive signal to the motor based on the read information of the rotation direction of the motor. For example, the controller 420 can be configured to read the stored information of the rotation direction of the motor, and control the driving circuit 410 to provide the corresponding drive signal to the motor based on the read information of the rotation direction of the motor.

In some embodiments, the method 300 can further include obtaining the control command for unlocking the rotation direction of the motor, and deleting the stored information related to the rotation direction of the motor according to the control command. For example, the controller 420 can be configured to obtain the control command for unlocking the rotation direction of the motor, and delete the stored information related to the rotation direction of the motor according to the control command.

A power system consistent with the disclosure is provided. The power system can include the one or more electronic governors and the one or more motors coupled to the one or more electronic governors described above.

A UAV consistent with the disclosure is provided. The UAV can include a rack, a flight controller mounted on the rack, and a plurality of power systems described above mounted on the rack. The flight controller can be electrically coupled to the electronic governors of the plurality of power systems, and configured to input a throttle signal to the electronic governors. The electronic governors can control the rotation of the motors according to the throttle signal to provide power to the UAV.

The functions implemented by hardware, software, and/or firmware described above may be implemented by dedicated hardware, a combination of general-purpose hardware and software, or the like. For example, functions implemented by dedicated hardware, e.g., a Field Programmable Gate Array (FPGA), an Application Specific Integrated Circuit (ASIC), or the like, may be implemented by general purpose hardware (e.g., a CPU, a DSP, or the like) in combination with software, and vice versa. For example, functions implemented by a Bluetooth module, a Near Field Communication (NFC) chip/coil, or the like, may be implemented by a general-purpose processor (e.g., a CPU, a DSP, or the like) in combination with a hardware (e.g., an analog-to-digital conversion circuit, an amplifying circuit, an antenna, or the like) and a software (e.g., a Bluetooth or NFC-related processing software), and vice versa.

It is intended that the embodiments disclosed herein be considered as example only and not to limit the scope of the disclosure. Changes, modifications, alterations, and variations of the above-described embodiments may be made by those skilled in the art without departing from the scope of the disclosure. The scope of the invention can be defined by the following claims or equivalent thereof

What is claimed is:

1. A method for controlling a motor comprising:
   obtaining addressing information of an electronic speed governor coupled to the motor;
   determining a rotation direction of the motor based on the addressing information; and
   providing a drive signal to the motor according to the rotation direction.

2. The method of claim 1, wherein determining the rotation direction of the motor includes determining the rotation direction based on a preset correspondence between the addressing information and the rotation direction of the motor.

3. The method of claim 1, wherein determining the rotation direction of the motor includes determining the rotation direction based on a calculation according to the addressing information.

4. The method of claim 1, wherein obtaining the addressing information includes:
   obtaining an addressing signal sent by an external controller; and
   determining the addressing information according to the addressing signal.

5. The method of claim 4, wherein the addressing signal includes a Pulse Width Modulation (PWM) signal.

6. The method of claim 1, wherein obtaining the addressing information includes:
   obtaining voltage information of an analog input port; and
   determining the addressing information according to the voltage information.

7. The method of claim 6, wherein obtaining the voltage information of the analog input port includes detecting, via the analog input port, a voltage value across a resistor connected in series with a communication link between the controller and the external controller.

8. The method of claim 1, further comprising:
   storing information of the rotation direction of the motor.

9. The method of claim 8, further comprising:
   reading the stored information of the rotation direction of the motor; and
   providing the corresponding drive signal to the motor based on the read information of the rotation direction of the motor.

10. The method of claim 8, further comprising:
    obtaining a control command for unlocking the rotation direction of the motor; and
    deleting the stored information related to the rotation direction of the motor according to the control command.

11. An electronic governor comprising:
    a driving circuit configured to provide a driving signal to a motor to drive the motor to rotate; and
    a controller electrically coupled to the driving circuit and configured to:
       determine a rotation direction of the motor based on addressing information of the electronic governor; and
       control the driving circuit to provide a corresponding driving signal to the motor according to the rotation direction.

12. The electronic governor of claim 11, wherein the controller is further configured to determine the rotation direction of the motor based on a preset correspondence between the addressing information and the rotation direction of the motor.

13. The electronic governor of claim 11, wherein the controller is further configured to determine the rotation direction of the motor based on a calculation according to the addressing information.

14. The electronic governor of claim 11, wherein the controller is further configured to:
    communicate with an external controller; and
    determine the addressing information according to an addressing signal sent by the external controller.

15. The electronic governor of claim 14, wherein the addressing signal includes a Pulse Width Modulation (PWM) signal.

16. The electronic governor of claim 11, wherein the controller further includes an analog input port and is configured to determine the addressing information according to voltage information of the analog input port.

17. The electronic governor of claim 16, wherein:
    a preset resistor is connected in series with a communication link between the controller and an external controller; and
    the analog input port is configured to detect a voltage value across the preset resistor.

18. The electronic governor of claim 11, further comprising:
    a memory configured to store information of the rotation direction of the motor.

19. The electronic governor of claim 18, wherein the controller is further configured to:
    read the stored information of the rotation direction of the motor; and
    control the driving circuit to provide the corresponding drive signal to the motor based on the read information of the rotation direction of the motor.

20. The electronic governor of claim 18, wherein the controller is further configured to:
    obtain a control command for unlocking the rotation direction of the motor; and
    delete the stored information related to the rotation direction of the motor according to the control command.

* * * * *